United States Patent Office 3,022,252
Patented Feb. 20, 1962

3,022,252
PLATINUM-ALUMINA CATALYST CONTAINING ADDED ALUMINUM CHLORIDE
Walter R. F. Guyer, Roselle, and Erving Arundale, Westfield, N.J., assignors to Esso Research and Engineering Company, a corporation of Delaware
No Drawing. Filed Nov. 27, 1953, Ser. No. 394,882
5 Claims. (Cl. 252—442)

This invention relates to the preparation of improved solid, noble metal alumina-supported catalysts containing added aluminum chloride, for the conversion of hydrocarbon materials. More particularly, it relates to novel platinum-alumina-aluminum chloride catalysts and to their method of preparation.

Recent developments in the petroleum refining industry have concentrated attention upon methods for the conversion of low boiling feed stocks, particularly those in the middle and heavy portions of the naphtha boiling range, into products of improved octane number. Considerable success along these lines has been obtained by the process known as hydroforming. In this process the hydrocarbon feed stock is treated at operating temperatures of about 700°–1000° F., in the presence of a catalyst of suitable activity and in a hydrogen-containing atmosphere at such a pressure that the hydrocarbon transformation reactions taking place result in a net production of hydrogen. A variety of reactions are involved, which include dehydrogenation, paraffin and naphthene isomerization, cyclization, or aromatization. All of these result together in producing a product of markedly improved motor fuel value as determined by octane rating.

A particularly useful catalyst for these operations has been found to be platinum supported on an alumina base. For instance, a commonly used composition of such a catalyst is one containing from 0.01 to 2.0 weight percent platinum, the remainder being the alumina spacing agent or base.

The operating conditions of the hydroforming operation are pressures in the range of 50 to 1000 p.s.i.g., usually 100 to 700 p.s.i.g., and temperatures in the range of 700°–1000° F., usually 875°–950° F. The hydrogen dilution may vary from about 1000 to 10,000 c.f./b.

The feed or charging stock to the hydroforming reactor can be a virgin naphtha, a cracked naphtha, a Fischer-Tropsch naphtha or the like, and mixtures thereof. The feed stock is preheated alone or in admixture with a recycle gas rich in hydrogen to reaction temperature or to the maximum temperature possible while avoiding thermal degradation of the feed stock.

Because of the large quantities of feed stocks that are processed in reactions such as hydroforming, a good deal of catalyst research has been expended in improving the selectivity of the conversion and/or the octane number obtainable.

It has now been found that the activity of platinum-alumina catalysts is significantly improved by the inclusion of aluminum chloride as an added third component which thereby allows the catalyst to be used at high space velocities. This aluminum chloride apparently helps bind and activate the platinum and alumina, possibly by some formation of complexes. The addition of this aluminum chloride as a third component accordingly differs significantly from the mere addition of halogen to the catalyst system.

The total catalyst system thus contains platinum in a range of from 0.01 to 2 weight percent platinum and from 0.1 to 15 weight percent aluminum chloride based on the total catalyst. The aluminum chloride is preferably incorporated in the catalyst system simultaneously with the platinum as spelled out in further detail below.

The types of alumina that can be used in the process of this invention include preferably synthetic aluminas at various stages in their manufacture, including the precipitated, dried, and activated forms. It thus applies to the various activated aluminas derived from precipitated alumina trihydrate or monohydrate, and from aluminum salts such as the chloride, acetate, etc. It also applies to aluminas prepared from metallic aluminum by the so-called "Patrick method" or by hydrolysis of an aluminum alcoholate, as well as to commercial activated aluminas such as Alorco F–10, Alorco H–41 (5% $SiO_2$) and the like.

Thus the various calcined forms of alumina are included, such as the structural forms gamma, delta, eta, theta, or kappa aluminas which have a surface area of 10 square meters per gram or higher. Furthermore, the aluminas can be stabilized by incorporating minor amounts of silica, boria, or $P_2O_5$, etc.

The alumina support can be used as received, or freshly prepared, or can be given a preliminary drying at temperatures of 250°–650° F. for about 2 to 24 hours.

The platinum is impregnated on the alumina support by means known in the art, and the aluminum chloride is preferably added at the same time. Thus one of the better means involves treatment of the alumina support with aqueous solutions of water-soluble inorganic platinum-containing compounds and aluminum chloride. The term "water soluble" also includes platinum-containing compounds which form colloidal solutions. Typical of the platinum-containing compounds are chloro-platinic acid, platinum disulphide, ammonium chloro platinate, and dinitrito-diamino-platinum. A conveniently used aqueous platinum solution is one containing 15 grams of $H_2PtCl_6 \cdot xH_2O$ (40% Pt) per liter. This strength can be employed to yield catalysts containing about 0.5% patinum; lower or higher concentrations are employed when it is desired to alter the patinum content of the final catalyst.

The aluminum chloride concentration is also accordingly varied. The gross amount of solution utilized is that required to impregnate with the desired amount of platinum and aluminum chloride. It is preferable to have just sufficient solution so as to just wet the total alumina. The alumina support in the platinum-aluminum chloride solution is heated to dryness, conveniently at temperatures of about 250° F. at atmospheric pressure, which results in the removal of most of the water and the desired impregnation. The platinum may also be introduced on the alumina by coprecipitation or by the combination of alumina and platinum hydrosols in the presence of added aluminum chloride.

An alternate, and very useful, method for preparing such aluminum chloride activated catalysts is as follows. Aluminum chloride hexahydrate (for example) is dissolved in distilled water and a solution of chloroplatinic acid added thereto. An aqueous solution of ammonia (or ammonia gas) is then added slowly thereto with efficient mixing. The amount of ammonia added is adjusted so that the conversion of aluminum chloride to aluminum hydroxide is incomplete. In other words, the aluminum chloride is in excess. The residual aluminum chloride and the chloroplatinic acid are thus intimately dispersed in the precipitated alumina. The slurry can then be dried or filtered. As a further alternate the chloroplatinic acid can be added to the slurry of alumina and aluminum chloride after the addition of the ammonia.

The final step in the preparation involves the subjection of the dried catalyst to a reduction step to convert platinum chloride to platinum. This reducing step can be carried out by means known in the art, such as hydrogenation, calcination, and treatment with chemical reducing agents such as hydrazine or its salts. Typical of these reduction operations is treatment with hydrogen at 200°–1000° F. with hydrogen pressures from atmospheric to 1000 pounds p.s.i.g. Calcining can be carried out at temperatures of the order of about 900°–1200° F. Both types of operations are preferably carried out slowly, for example, over the course of about 4 to 24 hours.

In some cases it may be desirable to minimize the amount of halide retained by the support. The halide can be removed by treating the catalyst by methods known in the art, such as by water washing, calcination in air or hydrogen, steaming, or treatment with ammonia.

This invention will be better understood by reference to the following examples of the preparation and the advantages of the catalyst of this invention.

EXAMPLE I

*Preparation of catalyst*

1000 grams of Alorco H–41 alumina was pulverized and dried overnight at 650° F. Six grams of aluminum chloride hexahydrate were dissolved in distilled water, 133 grams of chloroplatinic acid solution (1 gm.=0.00377 gram of platinum metal) were added and the solution made up to 890 cc. with additional distilled water. This solution was added slowly to the alumina powder and mixed thoroughly. The resulting paste was dried in a laboratory hood at room temperature for two days. The partially dried catalyst was then placed in a cold oven, the temperature of the oven was raised to 250° F., and the catalyst dried therein overnight. It was then pilled.

This catalyst thus contained 0.5 weight percent platinum and 0.35 weight percent aluminum chloride, or one mole of aluminum chloride per gram atom of platinum.

EXAMPLE II 1000 grams of Alorco H–41 alumina were pulverized and dried overnight at 650° F. 240 grams of aluminum chloride hexahydrate were dissolved in distilled water, 133 grams of chloroplatinic acid solution (1 gm.=0.00377 gram of platinum metal) was added and the combined solution made up to 890 cc. with additional distilled water. This was mixed thoroughly with the dried alumina and the paste allowed to dry in an evaporating dish for two days. The partially dried catalyst was then placed in a cold oven, the temperature of the oven was raised to 250° F., and the catalyst was dried therein overnight. It was then pilled and charged to the hydroforming reactor, where it was reduced by treatment with hydrogen at 900° F. This catalyst contained 11.5 weight percent aluminum chloride and 0.5 weight percent platinum based on the total catalyst.

This catalyst was then used in the hydroforming of a 200°–330° F. heavy virgin naphtha from a Coastal crude having a research clear octane number of 51. The conditions were as follows:

| | |
|---|---|
| Pressure _____p.s.i.g__ | 200 |
| Temperature _____° F__ | 900 |
| $H_2$/hydrocarbon mol ratio_____ | 6/1 |
| Space velocity_____w./hr./w__ | 1 |

The research clear octane number of the hydroformate was 100, indicating the marked effect of the catalyst.

The noble metal catalysts prepared in accordance with the present invention include platinum, palladium, gold, silver, etc., but platinum is preferred.

The platinum type catalysts of this invention are adapted for use in hydroforming, hydrogenation, hydrocracking, cracking, oxidation, and other reactions known to those in the art. The catalysts can be in the form of powders, pellets, etc.

The advantages of the process of this invention are of considerable importance in the field of hydroforming, where a higher octane number is obtained for a minimal cost.

As explained before, the aluminum chloride is preferably incorporated as a third component in the catalyst systems of this invention by simultaneous impregnation with the platinum, although it can be added at any point in the catalyst preparation.

It is to be understood that this invention is not limited to the specific examples, which have been offered merely as illustrations, and that modifications may be made without departing from the spirit of the invention.

What is claimed is:

1. An activated alumina-supported platinum catalyst comprising from 0.01 to 2 weight percent aluminum and containing as an added component aluminum chloride in an amount of from 0.1 to 15 weight percent based on the total catalyst.

2. An activated alumina-supported platinum catalyst comprising 0.5 weight percent platinum and as an added component 0.35 weight percent luminum chloride.

3. An activated alumina-supported platinum catalyst comprising 0.01 to 2 weight percent platinum and 0.1 to 15 weight percent added aluminum chloride based on the total catalyst, said aluminum chloride having been added on the alumina from an aqueous solution by simultaneous impregnation together with the platinum.

4. A process for the preparation of activated alumina-supported platinum catalysts which comprises contacting the activated alumina with an aqueous solution of aluminum chloride in an amount equivalent to from 0.1 to 15 weight percent and an inorganic platinum-containing compound in an amount equivalent to from 0.01 to 2 wt. percent PT, both based on the weight of total dried catalyst; drying the resultant system so as to impregnate platinum and aluminum chloride on the alumina; and reducing the dried catalyst system.

5. A process for the preparation of alumina-supported platinum catalysts which comprises contacting the alumina support with an aqueous solution of aluminum chloride in an amount equivalent to from 0.1 to 15 wt. percent and with chloroplatinic acid in solution in an amount equivalent to from 0.01 to 2 wt. percent Pt, both based on the weight of total dried catalyst; drying the resulting system so as to impregnate platinum and aluminum chloride on the alumina support; and reducing the dried catalyst.

References Cited in the file of this patent

UNITED STATES PATENTS

| | | |
|---|---|---|
| 2,277,512 | De Simo et al. | Mar. 24, 1942 |
| 2,309,263 | Thomas | Jan. 26, 1943 |
| 2,611,736 | Haensel | Sept. 23, 1952 |
| 2,662,860 | Engel et al. | Dec. 15, 1953 |
| 2,708,187 | Kearby | May 10, 1955 |
| 2,739,944 | Kearby | Mar. 27, 1956 |

UNITED STATES PATENT OFFICE
CERTIFICATE OF CORRECTION

Patent No. 3,022,252                                February 20, 1962

Walter R. F. Guyer et al.

It is hereby certified that error appears in the above numbered patent requiring correction and that the said Letters Patent should read as corrected below.

Column 4, line 21, for "aluminum" read -- platinum --; line 27, for "luminum" read -- aluminum --.

Signed and sealed this 3rd day of July 1962.

(SEAL)
Attest:

ERNEST W. SWIDER                            DAVID L. LADD
Attesting Officer                                 Commissioner of Patents